United States Patent [19]

Doyle

[11] 4,265,540
[45] May 5, 1981

[54] REFRACTIVELY SCANNED INTERFEROMETER

[75] Inventor: Walter M. Doyle, Laguna Beach, Calif.

[73] Assignee: Laser Precision Corporation, Utica, N.Y.

[21] Appl. No.: 80,287

[22] Filed: Oct. 1, 1979

[51] Int. Cl.³ .............................................. G01B 9/02
[52] U.S. Cl. ................................................... 356/346
[58] Field of Search ......................................... 356/346

[56] References Cited

U.S. PATENT DOCUMENTS

| 3,684,379 | 8/1972 | Girard | 356/346 |
| 4,165,938 | 8/1979 | Doyle | 356/346 |
| 4,190,366 | 2/1980 | Doyle | 356/346 |

*Primary Examiner*—Conrad J. Clark
*Attorney, Agent, or Firm*—Thomas J. Plante

[57] ABSTRACT

A refractively scanned interferometer, of the type in which a wedge-shaped prism is moved across one interferometer arm for scanning purposes, in which a similarly shaped fixed prism in the other arm provides optical compensation to avoid aberration problems. The beamsplitter surface is on the fixed wedge-shaped prism, and the two wedge-shaped prisms constitute the only refractive elements in the interferometer arms.

22 Claims, 4 Drawing Figures

REFRACTIVELY SCANNED INTERFEROMETER

BACKGROUND OF THE INVENTION

This invention relates to the field of interferometry, and particularly to scanning interferometers intended for use in spectrometry. More specifically, its primary focus is on improving Michelson interferometers intended for use in infrared Fourier transform spectroscopy.

The present invention is an improvement relating to the same general subject matter as three earlier filed applications assigned to the assignee of this application. Two of those applications were filed by the same inventor as the present application. The earliest was Doyle application Ser. No. 790,457, filed Apr. 25, 1977, now U.S. Pat. No. 4,190,366 titled "Refractively Scanned Interferometer." That patent discloses and claims an interferometer having stationary reflectors at the end of each interferometer "arm" combined with a wedge-shaped prism movable across one arm to cause scanning.

The other of the earlier related Doyle applications is Ser. No. 808,951, filed June 22, 1977, also titled "Refractively Scanned Interferometer", and issued on Aug. 28, 1979 as U.S. Pat. No. 4,165,938. That patent discloses and claims an interferometer of the same type as Application Ser. No. 790,457, now U.S. Pat. No. 4,190,366 wherein the orientation and direction of motion of the wedge-shaped scanning prism are such that displacement of the refracted optical beam by the prism is minimized or eliminated.

The third earlier-filed, commonly assigned patent application relevant to the present subject matter is Ser. No. 61,010, filed July 26, 1979 by William L. Clarke. The present application is directed to the same general purpose as Ser. No. 61,010, but is a significant improvement thereover, because it obtains the same or greater functional advantages with substantially lower cost and better operating efficiency.

As pointed out in Clarke application Ser. No. 61,010, the interferometers shown in the earlier Doyle applications have provided a significant development in the field of Fourier transform spectroscopy. However, certain performance limitations have become apparent in those interferometers, which are attributable to certain optical aberrations not fully compensated for in the earlier Doyle interferometers.

There are three general types of optical aberrations encountered in apparatus of this type: (a) chromatic aberration, (b) spherical aberration, and (c) astigmatic aberration.

The Clarke application Ser. No. 61,010 discusses at length the respects in which the earlier Doyle apparatus was subject to these optical aberrations. It is not necessary to repeat that discussion here.

The Clarke application provides an effective functional solution to these aberration problems by using a fully symmetrical interferometer, i.e., an interferometer in which the two interferometer arms are "mirror images" of one another when the movable prism is in its centered position.

In the Clarke apparatus, this symmetrical, or balanced, arrangement requires the use of two additional optical elements—one, an element matching, or balancing, the optical refractive effect of the beamsplitter substrate, and the other, a wedge-shaped prism matching, or balancing, the refractive effect of the movable prism in its centered position. In each case the added balancing means is located in the other arm of the interferometer from the member whose refractive effect it balances.

Thus the Clarke apparatus solves the aberration problems quite effectively, but it does add two optical elements to the interferometer. The adding of these elements has a two-fold disadvantage. They add substantial cost to the interferometer structure; and they cause significantly larger optical losses due to the added reflecting surfaces. In the Clarke apparatus, the larger optical losses are due both (a) to the simple reflection losses resulting from the added reflecting surfaces, each of which causes a loss of approximately 4% of the radiation, and (b) to the degradation in coherence resulting from any imperfections in these added surfaces. The latter effect can be significant in view of the difficulty of polishing otherwise desirable optical materials, such as potassium bromide (KBR), which is desirable because of its broad optical characteristics, i.e., the broad infrared transmission it permits.

The purpose of the present invention is to provide a structure which retains the aberration-compensating benefits of the Clarke apparatus, while eliminating the disadvantages of increased cost and optical losses, mentioned in the preceding paragraph.

SUMMARY OF THE INVENTION

The present invention accomplishes the desired results by using two refractive elements, one in each interferometer arm, which elements are substantially the same in their shapes and optical refractive characteristics. Each element is a wedge-shaped prism. One of them is movable for scanning purposes; the other is stationary and preferably is the one having the beamsplitter surface.

The movable prism is preferably very close to the fixed prism and moves along a line parallel to the adjacent surface of the fixed prism. Each interferometer "arm" is perpendicular to the prism surface nearest the reflector at the end of that arm, i.e., the radiation exiting and entering the surface of each prism nearest its reflector intersects that surface at right angles thereto, thus insuring that the motion of the moving prism will conform to the requirements explained in Doyle U.S. Pat. No. 4,165,938.

In one species of the invention, the prisms have three optical (polished) surfaces, and are so designed that the radiation toward each reflector intersects one optical surface of the respective prism, whereas the radiation from the source, or toward the detector, intersects a different optical surface of the respective prism.

The present invention deals with astigmatic aberration by using the movable prism as a balancing element for the beamsplitter substrate; and it deals with spherical and chromatic aberration by matching the movable prism with a substantially identical fixed prism in the other arm of the interferometer.

DETAILED DESCRIPTION OF SPECIFIC EMBODIMENTS

Figure 1:
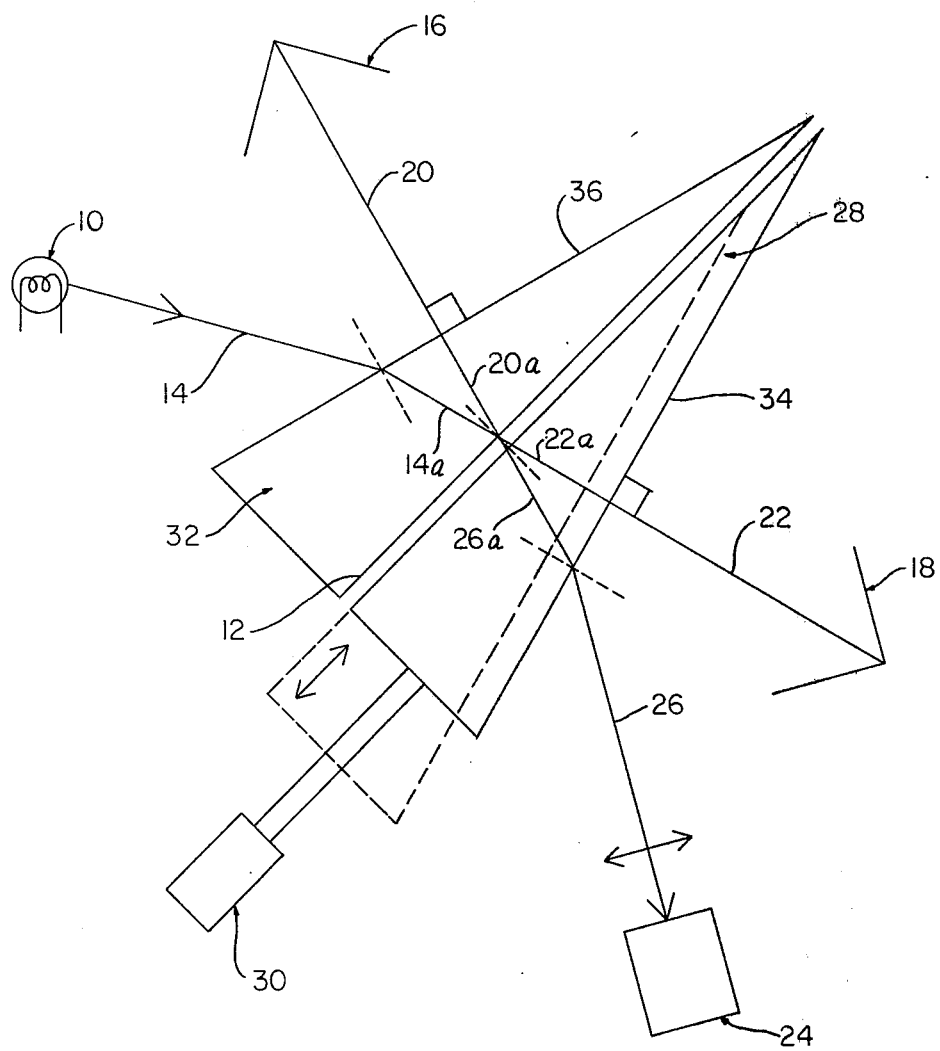
FIG. 1 is a diagrammatic plan view of an interferometer incorporating the present invention.

First, referring to FIG. 1, the elements which are included in the earlier Doyle applications will be described; and then a detailed analysis will be made of the present invention and its manner of solving the aberration problems.

The Doyle apparatus includes essentially a light source 10; a beamsplitter 12 which partially reflects and partially transmits (preferably with a 50—50 division) the radiation beam whose direction of incidence is indicated by ray 14; two interferometer "arms" to reflect the "split" radiation beams 20 and 22, respectively; a detector 24 which receives the recombined radiation 26; and a movable wedge-shaped prism 28 which moves across the path of beam 22 to cause refractive scanning, suitable driving means 30 being provided to cause the movement of prism 28 back and forth across the radiation path. The stationary reflectors 16 and 18 are retro-reflectors, because of significant functional benefits, even though some of their benefits are provided by the optical compensation features incorporated in the present invention. The retro-reflectors 16 and 18 are shown as "cube corner" reflectors; but other types of retro-reflectors, i.e., "cate-eye" reflectors, or "rooftop" reflectors, may be used.

For the reasons taught by Doyle U.S. Pat. No. 4,165,938, it is important that the direction of scanning motion and the orientation of the prism 28 be such that the apparent deflection point of each optical ray passing through the prism remains at substantially the same position throughout scanning motion of the prism. The arrow in the Figure shows the appropriate direction of scanning motion of the prism 28 for the configuration shown. And the dashed lines illustrate one of the positions to which the prism moves as a result of its translatory motion.

In Clarke application Ser. No. 61,010, a compensating element is provided to match the optical effects of the beamsplitter substrate, and a separate wedge-shaped compensating element is provided to match the optical effects of the movable wedge-shaped scanning prims. In each case, the compensating element is, of course, located in the interferometer arm other than the arm in which is located the member whose optical effects are being compensated for. In the preferred arrangement, the beamsplitter substrate and the fixed compensating wedge are in one interferometer arm, and the movable scanning wedge and the beamsplitter compensating element are in the other interferometer arm.

In order to provide the aberration-avoidance benefits of the Clarke structure while reducing the number of armintersecting optical elements to two instead of four, it is necessary to make the movable scanning wedge and the beamsplitter substrate mutually compensating elements. Therefore, they are substantially identical, as shown. The beamsplitter substrate is shown at 32, and it constitutes a wedge-shaped member having the same shape and optical characteristics as the scanning wedge, or prism, 28. The beamsplitter 12 is provided by a coating on the inner surface of substrate element 32, i.e., the surface nearest scanning wedge 28. The movable wedge-shaped prism, or scanning wedge, 28 and the fixed wedge-shaped prism, or beamsplitter substrate, 32 are so arranged as to be "mirror images" of one another in the two arms of the interferometer.

Figure 4:
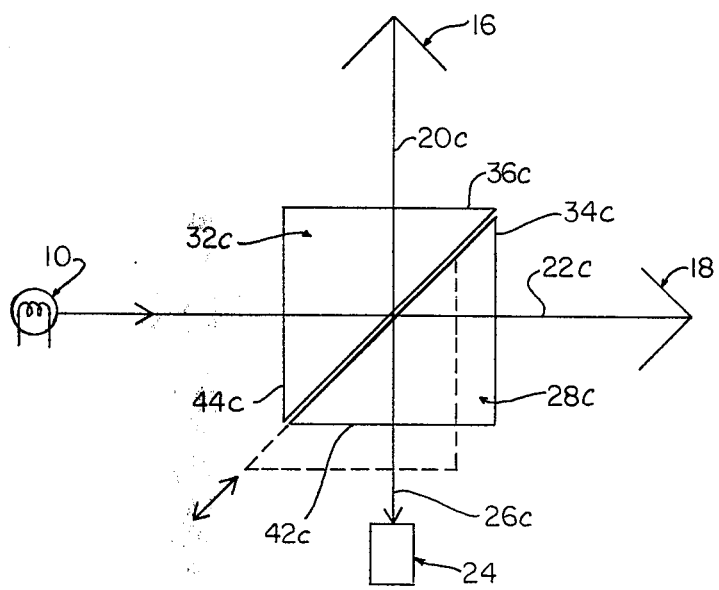
FIG. 4 is a particular example of the interferometer of FIG. 3, in which the interferometer arms are perpendicular to one another.

It is obvious from the figure that the two arms of the interferometer, i.e., the optical paths 20 and 22, are not at right angles to one another, as is usually the case in Michelson interferometers. The only case in which the arms are at right angles is illustrated in FIG. 4, which is discussed below. The major departures in the present invention from customary interferometer design are a result of the fundamental functional uniqueness of the interferometer disclosed herein.

The orientation of interferometer arms 20 and 22 is dictated by the requirement that arm 22 be perpendicular to the nearest surface 34 of the movable wedge 28. This requirement is based on the direction of motion of the movable wedge, and on the fact, taught by Doyle application Ser. No. 808,951, that the apparent deflection point of the optical beam passing through the movable wedge should remain at the same position throughout the scanning motion.

The direction of motion of the movable wedge 28 should be in the direction shown for effective functioning of the interferometer. The space between the two optical wedges 32 and 28 should be as small as possible, consistent with the avoidance of mechanical contact between them as wedge 28 is moved. This closeness of wedges 32 and 28 is important in order to minimize chromatic aberration. If they were not located very close, the lever arms between each wedge and its related corner reflector (16, 18) would be different, and differential wavelength-dependent lateral displacements at the reflectors would occur. Another way of explaining the requirement for closeness of the two wedges is to point out that they must be close in order to balance the interferometer arms, which should be as nearly identical as possible. In other words, everything in the two arms should be symmetrical with respect to the beamsplitter surface 12, which is the "center" of the interferometer. If the two wedges were in contact with one another, the interferometer arms would be identical. But such contact is not possible because of the scanning motion of wedge 28.

Figure 2:
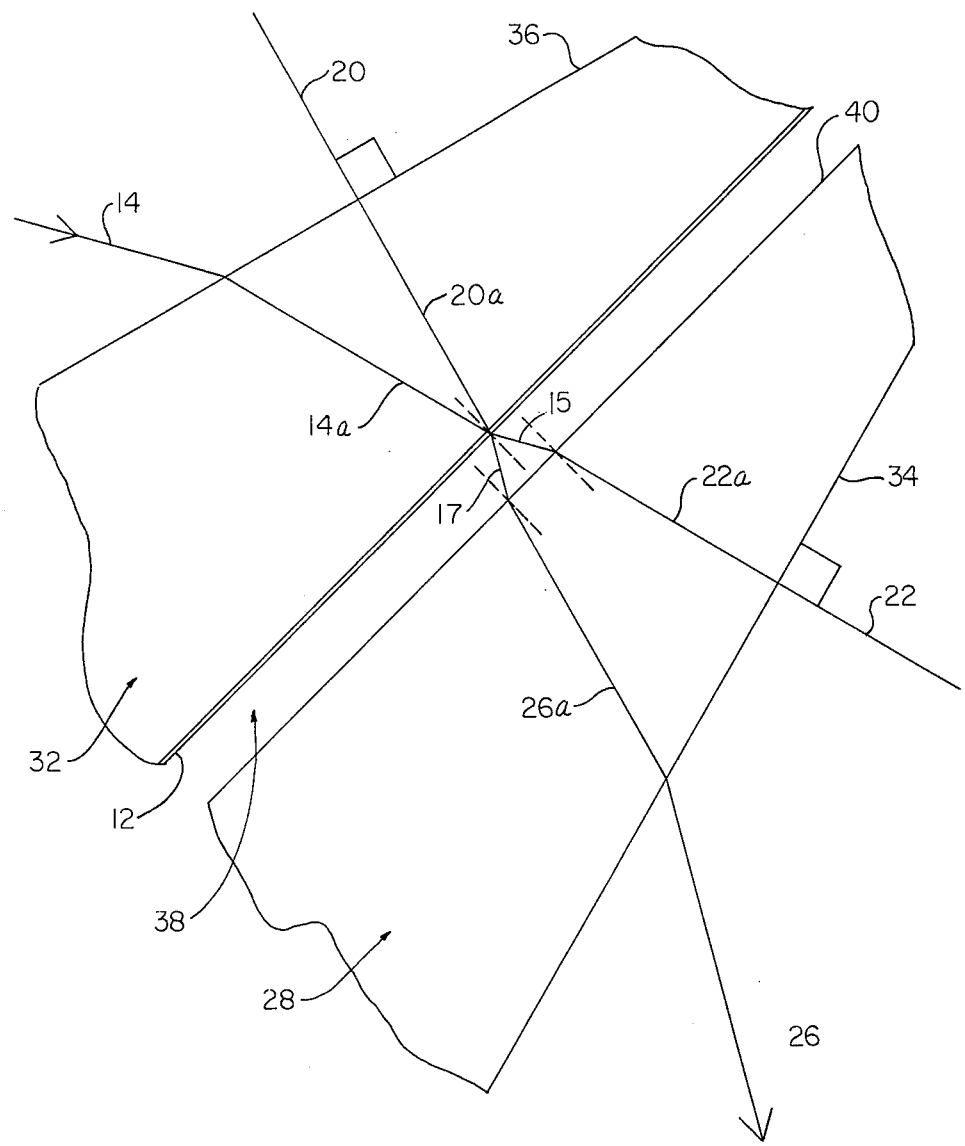
FIG. 2 is a closeup of the wedge-shaped prisms of FIG. 1, showing more clearly the changes in direction of the radiation paths.

This situation is more clearly depicted in FIG. 2, which is a closeup of the "center" of the interferometer. As shown in FIG. 2, the optical path 14 from the source is deflected at surface 36 of wedge 32 to follow path 14a within the wedge, and is deflected again to follow path 15 as it leaves the inner surface of wedge 32 at beamsplitter 12. Thus a deflected optical path 15 occurs in the air gap 38 between the two wedges. As optical path 15 intersects inner surface 40 of movable wedge 28, it is again deflected, and it then follows optical path 22a, which is that portion of arm 22 within wedge 28, and which is parallel to path 14a. The lateral deflection of path 22a from path 14a should be minimized in order to minimize chromatic aberration by keeping air gap 38 as small as possible.

It is important that optical path 22a within movable wedge 28 and the remainder of arm 22 leading to reflector 18 be in direct alignment with one another, i.e., that they constitute a non-deflected straight line. And this will be true only if arm 22 is perpendicular to surface 34 of wedge 28.

The direction of scanning motion of wedge 28, as shown by the arrow, must be parallel to the beamsplitter 12 because of the requirement for minimized space between the two wedges throughout the scan. At the same time, as taught in Doyle U.S. Pat. No. 4,165,938, the wedge motion must be along the line defined by the apparent deflection points of the rays passing through the scanning wedge 28. Therefore, it is necessary to simultaneously meet these two requirements. In order to do so, the deflection point of the optical path 22a through wedge 28 must remain at the inner surface 40 of the wedge as scanning motion occurs. This will only be true if optical paths 22a and 22 are in direct alignment, thus causing inner surface 40 of wedge 28 to be the only deflecting surface for the optical path through scanning wedge 28. In other words, in order for the deflection of the optical path to take place at the inner surface 40 of the scanning wedge, the optical path must be perpendicular to the outer surface 34 of the scanning wedge.

The design requirement that optical path 22 be perpendicular to surface 34, combined with the parallelism requirement of surfaces 12 and 40, determines the direction of portion 14a of the optical path, and also determines the direction of portion 14, once the angle of the wedges has been determined. The decision as to the apex angle of scanning wedge 28 depends on the desired length of the scanning motion. A relatively narrow angle has the advantage of minimizing the criticality of mechanical motion. A relatively wide angle has the advantage of providing a greater effective optical scanning distance, and hence improved spectral resolution for a given mechanical scanning distance.

Once the apex angle of scanning wedge 28 has been determined, the apex angle of fixed wedge 32 is established, because the two wedges must be substantially identical in order to make the interferometer arms symmetrical, thereby minimizing optical aberrations. Because of the equal angles of wedges 28 and 32, the optical geometry results in a perpendicular relationship between optical path, or arm, 20 and the outer surface 36 of fixed wedge 32, i.e., optical path 20 is in direct alignment with the portion 20a thereof which passes through the fixed wedge.

The radiation which recombines at the beamsplitter 12, coming from arm 22 reflected by mirror 18, and from arm 20 reflected by mirror 16, follows optical path 17 through air gap 38, and is deflected at surface 40 of wedge 28 to follow optical path 26a through the wedge. It is deflected again as it exits the wedge at surface 34, and thereafter follows optical path 26 to the detector 24. It will be noted that, as wedge 28 is moved for scanning purposes, the optical path 26 is laterally displaced, as shown by the arrow crossing path 26. This lateral displacement of the output beam 26 can be adjusted for at the detector 24 by increasing the size of the focusing optics.

While, theoretically, the beamsplitter coating 12 could be provided on the inner surface of movable wedge 28 instead of the inner surface of fixed wedge 32, it is much better to locate it on the fixed wedge because the alignment of the beamsplitter in the interferometer is critical, and movement of the beamsplitter would tend to cause misalignment.

In the centered position of the interferometer, the length of the optical path through the movable wedge 28 should equal its length through the fixed wedge 32. Therefore, the initial adjustment of the position of movable wedge 28 to "center" it will include an adjustment to compensate for the slight lateral displacement of the optical path 14a-22a due to air gap 38.

It will be apparent that the three forms of optical aberration—astigmatic, spherical, and chromatic—are compensated for, or balanced, to substantially the same extent as in Clarke application Ser. No. 61,010.

Astigmatic aberration is minimized by the fact that the optical path intersects the refractive surfaces within the interferometer at the same angle in each arm of the interferometer. Astigmatism is cause when light goes through a critical inner surface of the interferometer, such as the beamsplitter substrate, at a non-perpendicular angle. This is compensated for by the balancing effect due to the equal angle of intersection of the optical path with the inner surface of the other wedge, i.e., the scanning wedge. In other words, the angle of intersection of the optical path is the same at the inner surface 40 of scanning wedge 28 as it is at the inner surface of fixed wedge 32 which carries the beamsplitter coating 12. Thus the astigmatic effects created in one wedge are substantially "cancelled out" as the beam enters the other wedge.

Spherical aberration is also substantially "cancelled out" because both the non-refractive and the refractive optical path lengths in the two interferometer arms are substantially identical in the centered position of the scanning wedge.

Chromatic aberration is minimized by providing matching wedges having equal apex angles, thus balancing the effects of the chromatically dispersed wavefront in one interferometer arm with a similar chromatically dispersed wavefront in the other interferometer arm.

Figure 3:
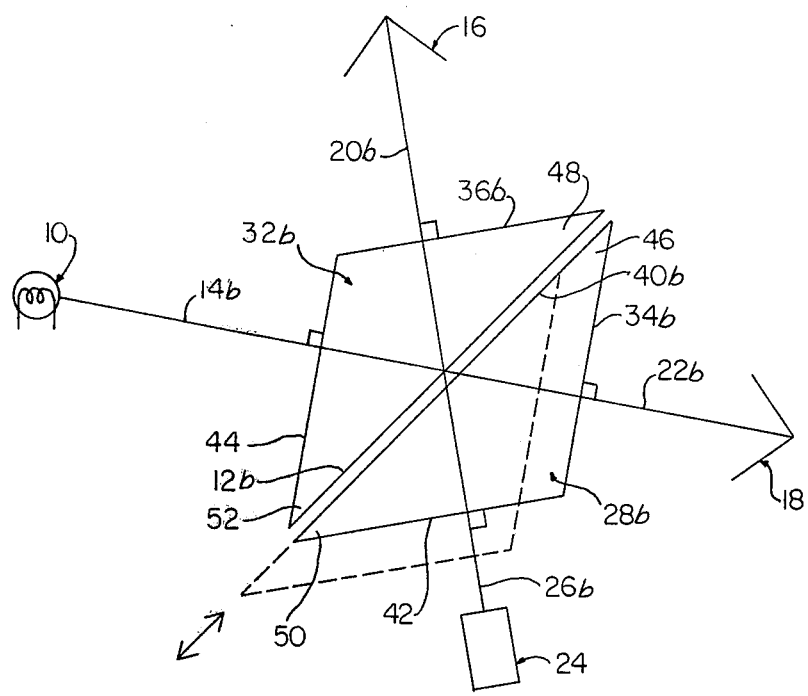
FIG. 3 is a diagrammatic plan view of a modified version of the invention, in which the wedge-shaped prisms each have a third optical surface through which entering or exiting radiation passes.

FIG. 3 shows an embodiment of the invention in which each wedge-shaped refractive element—the movable scanning wedge and the fixed compensating wedge—has three polished surfaces instead of two, and is so designed that (a) the optical path from the source intersects the fixed wedge at a different surface of the fixed wedge from the surface intersected by the optical path to the adjacent reflector, and (b) the optical path to the detector intersects the movable wedge on a different surface of the movable wedge from the surface intersected by the optical path to the adjacent reflector. This has certain functional advantages over the embodiment of FIGS. 1 and 2, but it is only applicable where a wider wedge angle is usable for scanning purposes.

The design illustrated in FIGS. 1 and 2 works quite well for small wedge angles and is probably usable with wedge angles as large as 20 or even 30 degrees. However, as the wedge angle is increased, it becomes necessary to increase the lengths of the wedges so that all four of the optical beams—14, 20, 22, and 26—will enter and leave the wedges through the polished surfaces. In addition, the lateral displacement during scanning of beam 26 leading to the detector will become more severe as the wedge angle is increased.

The use of a large wedge angle may be desirable in some cases, particularly when a large effective optical scanning distance is desired, as in high resolution spectroscopy. For such cases, the geometry of FIG. 3 will be advantageous. As shown, the movable scanning wedge 28b has three optical (polished) surfaces—inner surface 40b adjacent beamsplitter 12b, surface 34b nearest reflector 18, and a third optical surface 42 which is intersected by the optical path 26b leading to detector 24. The fixed compensating wedge 32b also has three optical (polished) surfaces—the inner surface on which beamsplitter coating 12b is supported, surface 36b nearest reflector 16, and a third optical surface 44 which is intersected by the optical path 14b leading from radiation source 10. Because of the presence in FIG. 3 of significant angles at both ends of the inner surfaces of both wedges, the wedge, or apex, angle of movable wedge 28b which determines the refractive changes during scanning is identified by the numeral 46, and the related, or balancing, angle of fixed wedge 32b is indicated by the numeral 48. As in the preceding embodiment, these angles 46 and 48 are equal in order to minimize optical aberrations. The size of angles 46 and 48 is determined by the desired scanning parameters.

Also, for the reasons discussed in connection with FIGS. 1 and 2, it is necessary that optical path 22b leading to reflector 18 be substantially perpendicular to the surface 34b of scanning wedge 28b nearest reflector 18. Consequently, optical path 20b leading to reflector 16 will be substantially perpendicular to the surface 36b nearest reflector 16. Also it is necessary that the direction of motion of wedge 28b during scanning be substantially parallel to the beamsplitter 12b, as indicated by the arrow.

A further advantage will result if surface 42 of scanning wedge 28b is made parallel to surface 36b of fixed wedge 32b. In this case, as shown, the detector beam 26b will automatically be perpendicular to the exit surface 42, and no displacement of this beam will occur during scanning, as demonstrated by the dashed line position of the scanning wedge. For this condition, the cross section of the scanning wedge 28b will be an isoceles triangle, i.e., its angle 50 will equal its angle 46. For symmetry, we may also make angle 52 of fixed wedge 32b equal to angles 46, 48 and 50, with all optical paths entering and leaving the two wedges at right angles. This latter condition has the additional advantage of eliminating any chromatic dispersion of the incoming light beam 14b.

FIG. 4 illustrates a species of FIG. 3 which constitutes the only design in which the interferometer arms are perpendicular to one another. In FIG. 4, the movable scanning wedge 28c and the fixed compensating wedge 32c constitute, geometrically, a split cube. The cross-section of each wedge is a right-angled triangle, in which the angles 46c, 48c, 50c and 52c are each 45°. The arms of the interferometer—optical paths 20c and 22c, leading to the respective reflectors 16 and 18—are perpendicular to one another. The other relationships described in connection with FIG. 3 are applicable, including the fact that optical path 26c to detector 24 is not laterally displaced during scanning, as demonstrated by the dashed line position of scanning wedge 28c.

The large wedge angle in FIG. 4, which determines the ratio between wedge motion and spectral resolution, has the disadvantage that it decreases the optomechanical scan amplification, but it has the advantage of providing a higher resolution.

The optical structures of FIGS. 3 and 4 provide the same benefits as that of FIGS. 1 and 2, insofar as the balancing of, or compensating for, optical aberrations is concerned. The explanation of these aspects of the present invention has already been provided.

As pointed out in Clarke application Ser. No. 61,010, the best results, in terms of avoidance of spherical, astigmatic and chromatic aberrations, in an interferometer of the refractive type, can be obtained by providing completely symmetrical interferometer arms, in which both the beamsplitter substrate and the scanning wedge are fully compensated for, or balanced, in the other arm of the interferometer. In the present invention, only two optical elements are required, each balancing the other.

With this fully symmetrical arrangement, the interferometer will have no limit on field of view when the scanning wedge is at centered position.

Although the primary solution of the chromatic aberration problem is provided by the matched wedges, it is still highly desirable, and in fact necessary, to use retro-reflectors 16 and 18. The retro-reflectors are considered necessary because the wedge-shaped prisms, if flat reflective mirrors were used, would create a dispersion of rays which, while identical in the two arms, would be too broadly dispersed at the detector 24. Additionally, the retro-reflectors provide several advantages; and, because they are both stationary, there is no problem due to their relative bulk. For one thing, they tend to compensate for any chromatic aberration due to imperfect matching of the two wedge-shaped prisms 28 and 32. Use of retro-reflectors also makes the optical system less vulnerable to problems due to slight misalignment of the wedge-shaped scanning prism 28. In other words, use of retro-reflectors reduces sensitivity to angular errors of the wedge motion. Furthermore, the retro-reflectors tend to compensate for astigmatism in the system. And finally, the retro-reflectors provide a preferred approach to dual beam, i.e., dual detector, spectroscopy, as discussed in Doyle application Ser. No. 790,457, now U.S. Pat. No. 4,190,366 and also in a Doyle application titled "Dual Beam Fourier Spectrometer", Ser. No. 830,576, filed Sept. 6, 1977 now U.S. Pat. No. 4,183,669.

The interrelation of the various optical features of the present invention is significant in providing the desired accuracy of the complete apparatus. As explained in Doyle application Ser. No. 808,951, now U.S. Pat. No. 4,165,938 the orientation and direction of motion of the scanning wedge 28 are of particular importance where retro-reflectors are used. And, as outlined above, the retro-reflectors contribute to the solution of the aberration problems; and their use is made feasible by the fact that scanning is accomplished by wedge 28 and not by movement of one of the reflectors. Given the foregoing facts, it becomes desirable in balancing out the aberration problems to compensate for both the beamsplitter and the scanning wedge, as detailed above.

The following claims are intended not only to cover the specific embodiments disclosed, but also to cover the inventive concepts explained herein with the maximum breadth and comprehensiveness permitted by the prior art.

I claim as my invention:

1. A spectral analysis interferometer, of the type having a first arm in which the optical path leads to a first reflector and a second arm in which the optical path leads to a second reflector, comprising:
    a movable scanning prism having a wedge angle to vary its refractive path length and movable across the optical path of the first interferometer arm;
    a fixed prism having a wedge angle substantially equal to that of the scanning prism and located in the second arm of the interferometer in such a way as to substantially balance the refractive effects in the two arms when the scanning wedge is in its centered position; and
    a beamsplitter surface supported on one of the prisms.

2. The spectral analysis interferometer of claim 1, wherein the beamsplitter surface is supported on the fixed prism.

3. The spectral analysis interferometer of claim 2, wherein the scanning prism is located as close as practicable to the beamsplitter surface, and the direction of motion of the scanning prism is parallel to the beamsplitter surface.

4. The spectral analysis interferometer of any of claims 1, 2 or 3, wherein the optical path of the first arm intersects at right angles the surface of the scanning prism nearest the first reflector.

5. The spectral analysis interferometer of claim 4, werein the optical path of the second arm intersects at right angles the surface of the fixed prism nearest the second reflector.

6. The spectral analysis interferometer of claim 1, 2 or 3, wherein the scanning prism is the only refractive element in the first arm, and the fixed prism is the only refractive element in the second arm.

7. The spectral analysis interferometer of claim 4, wherein the scanning prism is the only refractive element in the first arm, and the fixed prism is the only refractive element in the second arm.

8. The spectral analysis interferometer of claim 2 or 3, wherein the scanning prism has three optical surfaces, the first of which is parallel to the beamsplitter surface, the second of which is intersected by the first interferometer arm, and the third of which is intersected by the optical path exiting the interferometer.

9. The spectral analysis interferometer of claim 8, wherein the optical path of the first interferometer arm intersects at right angles the surface of the scanning prism nearest the first reflector.

10. The spectral analysis interferometer of claim 8, wherein the scanning prism is the only refractive element in the first interferometer arm, and the fixed prism is the only refractive element in the second interferometer arm.

11. The spectral analysis interferometer of claim 8, wherein the fixed prism has three optical surfaces, the first of which is the beamsplitter surface, the second of which is intersected by the second interferometer arm, and the third of which is intersected by the optical path entering the interferometer.

12. The spectral analysis interferometer of claim 9, wherein the fixed prism has three optical surfaces, the first of which is the beamsplitter surface, the second of which is intersected by the second interferometer arm, and the third of which is intersected by the optical path entering the interferometer.

13. The spectral analysis interferometer of claim 10, wherein the fixed prism has three optical surfaces, the first of which is the beamsplitter surface, the second of which is intersected by the second interferometer arm, and the third of which is intersected by the optical path entering the interferometer.

14. The spectral analysis interferometer of any of claims 1, 2 or 3, wherein the first and second reflectors are retro-reflectors.

15. The spectral analysis interferometer of claim 4, wherein the first and second reflectors are retro-reflectors.

16. The spectral analysis interferometer of claim 6, wherein the first and second reflectors are retro-reflectors.

17. The spectral analysis interferometer of any of claims 1, 2 or 3, wherein the angle between the first and second interferometer arms is greater than ninety degrees.

18. The spectral analysis interferometer of claim 4, wherein the angle between the first and second interferometer arms is greater than ninety degrees.

19. The spectral analysis interferometer of claim 8, wherein the second optical surface of the scanning prism is intersected at right angles by the first interferometer arm, and the third optical surface of the scanning prism is intersected at right angles by the optical path exiting the interferometer.

20. The spectral analysis interferometer of claim 19, wherein the fixed prism also has three optical surfaces, the first of which is the beamsplitter surface, the second of which is intersected at right angles by the second interferometer arm, and the third of which is intersected at right angles by the optical path entering the interferometer.

21. The spectral analysis interferometer of claim 19, wherein the angles between the first optical surface and each of the other two optical surfaces on the same prism are forty-five degrees.

22. The spectral analysis interferometer of claim 20, wherein the angles between the first optical surface and each of the other two optical surfaces on the same prism are forty-five degrees.

* * * * *